United States Patent [19]
Tiedman

[11] Patent Number: 5,427,134
[45] Date of Patent: Jun. 27, 1995

[54] ROTARY VALVE FOR HYDRAULIC POWER STEERING

[75] Inventor: Kelvin J. Tiedman, Gymea Bay, Australia

[73] Assignee: James N. Kirby Products Pty Limited, Australia

[21] Appl. No.: 232,125

[22] PCT Filed: Oct. 28, 1992

[86] PCT No.: PCT/Au92/00580
§ 371 Date: Jul. 11, 1994
§ 102(e) Date: Jul. 11, 1994

[87] PCT Pub. No.: WO93/09019
PCT Pub. Date: May 13, 1993

[30] Foreign Application Priority Data

Oct. 29, 1991 [AU] Australia .................... PK9192

[51] Int. Cl.$^6$ ........................... B62D 5/083
[52] U.S. Cl. .................. 137/315; 137/625.24; 91/375 A
[58] Field of Search ........... 137/315, 625.21, 625.22, 137/625.23, 625.24; 91/375 R, 375 A

[56] References Cited

U.S. PATENT DOCUMENTS

| | | | |
|---|---|---|---|
| 4,385,898 | 5/1983 | Jordan | 91/375 A X |
| 4,428,399 | 1/1984 | Masuda et al. | 91/375 A X |
| 4,966,192 | 10/1990 | Umeda | 91/375 A X |
| 5,230,273 | 7/1993 | Fraley, jr. | 91/375 A X |

Primary Examiner—John Rivell

[57] ABSTRACT

A rotary valve for hydraulic power steering of vehicles in which one or more slots in the sleeve of the valve are constructed to exit from the end of the sleeve to form, in an annular extension of the sleeve, a radially extending aperture the sides of which are in alignment with the sides of a slot in the sleeve. The input shaft has formed on its surface at a point externally of the sleeve one or more projections aligned with one or more of the lands between blind ended slots so that by the use of an appropriate tool each projection can be brought into and held accurately in alignment with one of the apertures on the sleeve so that permanent connection of the input shaft and torsion bar can be carried out to ensure symmetry of operation of the valve.

4 Claims, 4 Drawing Sheets

ROTARY VALVE FOR HYDRAULIC POWER STEERING

This invention relates to rotary valves and more particularly to rotary valves for hydraulic power steering of vehicles.

Typically such valves include an input-shaft, usually connected to the steering wheel of the vehicle by a flexible joint, and having in its outer periphery a plurality of blind ended, longitudinally extending slots separated by lands. Journalled on the input-shaft is a sleeve member having in its bore a similar array of longitudinally extending slots matching those of the input-shaft, but in underlap relationship thereto, the slots of the one being wider than the lands of the other so defining a set of longitudinally extending orifices which open and close when relative rotation occurs between the input-shaft and the sleeve.

Drilled passages in the input-shaft and sleeve, together with circumferential grooves in the periphery of the sleeve, serve to communicate oil between the slots in the input-shaft and sleeve, an engine driven oil pump, and right-hand and left-hand hydraulic assist cylinder chambers incorporated in the steering gear.

A torsion bar incorporated in the input-shaft serves to urge the input-shaft and sleeve towards a neutral, centered condition when no power assistance is required. When torque is applied by the driver to the steering wheel, the torsion bar deflects, allowing relative rotation of the sleeve and input-shaft from the neutral condition, so directing oil to the right-hand and left-hand assist cylinder chambers.

The general method of operation of such rotary valves is well known in the art of power steering design and so will not be described in any greater detail in this specification. An excellent description of this operation is contained in U.S. Pat. No. 3,022,722 (Zeigler), commonly held as being the "original" patent disclosing the rotary valve concept.

It is a requirement of operation of a steering gear that the left and right turn operation of the hydraulic assist be as nearly as possible identical, and this symmetry of operation can only be determined at assembly of the steering valve components.

Great accuracy is required in adjusting the exact position of the torsion bar relative to the input shaft to ensure this symmetry and once this position is determined, it must be retained for the life of the steering gear.

According to the most common present practice, the torsion bar is secured to the input shaft by a pin pressed through a hole drilled and reamed through in a hydraulic "balance" or "trimming" machine.

In one such machine, both the input shaft and the torsion bar are independently clamped to a drive mechanism capable of making fine angular adjustments of one relative to the other. This whole drive mechanism however, must be capable of being rotated and have precisely determined input torques, or angles depending on the system used, applied thereto while the resulting pressure in left and right turn cylinders are noted. When precise balance has been achieved, the drive mechanism stops rotating and the entire valve assembly and drive mechanism is moved in the "trimming" machine successively into stations or positions where the above referenced drilling and reaming is performed, and a further station at which a pin is pressed into the hole.

It frequently happens that during these various operations, the precise adjustment is disturbed and it is found on inspection of the completed steering gear or valve assembly that valve operation is no longer symmetrical. This requires that the assembly be extensively reworked at great cost and inconvenience. Furthermore, it is an undesirable feature of this existing method that, on a precise machine such as the trimming machine just described, involving sensing devices for both pressure and input torque or angle, and supplied with carefully monitored flow of oil at regulated pressure and flow, that drilling and reaming operations are carried out with the danger of contaminating the machine system.

Several attempts have been made to solve this problem, and to avoid the scrappage which occurs when asymmetry is detected and to allow the assembly operation to proceed without the contaminating influence of the machining operation. They have not been satisfactory and will not be described in any detail but some examples are U.S. Pat. No. 3,145,626 (James L. Vickers and Farlow V. Burt) and Australian patent specification 563935 (A. E. Bishop and Associates).

It is the means of locating the sleeve relative to the input shaft angularly in a neutral centered position and also axially whilst the connection between the input shaft and torsion bar is performed which is the subject of the present invention.

The limitation of the existing trimming system and the attempts listed above are that they are measuring functional outcomes i.e. pressures and input torques and or angles in an attempt to locate precisely the metering edges on the input shaft and sleeve relative to each other.

The key to the present invention is the direct mechanical location of the sleeve metering edges relative to the valve metering edges.

The present invention consists in a rotary valve for hydraulic power steering of vehicles comprising an input shaft incorporating a torsion bar, the input shaft having in its outer periphery a plurality of blind ended, longitudinally extending slots separated by lands, a sleeve fitting closely about the input shaft and rotatable and movable axially in relation thereto, the sleeve having in its bore a similar array of longitudinally extending slots matching those of the input shaft but in underlap relationship thereto, the slots of the one being wider than the lands of the other so defining a set of longitudinally extending orifices which open and close when relative rotation occurs between the input shaft and the sleeve characterised in that one or more of the slots in the sleeve is constructed to exit from the end of the sleeve to form, in an annular extension of the sleeve, a radially extending aperture, the sides of which are in alignment with the sides of the slot in the sleeve, the input shaft having formed in its surface at a point externally of the sleeve one or more projections or other irregularities each of which is precisely aligned with one of the lands in the input shaft the arrangement being such that, by means of an appropriate tool each projection or irregularity on the input shaft can be brought into and held in accurate alignment with one of said apertures on the sleeve to permit permanent connection of the input shaft and torsion bar and ensure symmetry of operation of the valve.

In order that the nature of the invention may be better understood and put into practice a preferred form thereof is hereinafter described by way of example with reference to the accompanying drawings in which.

Figure 1:
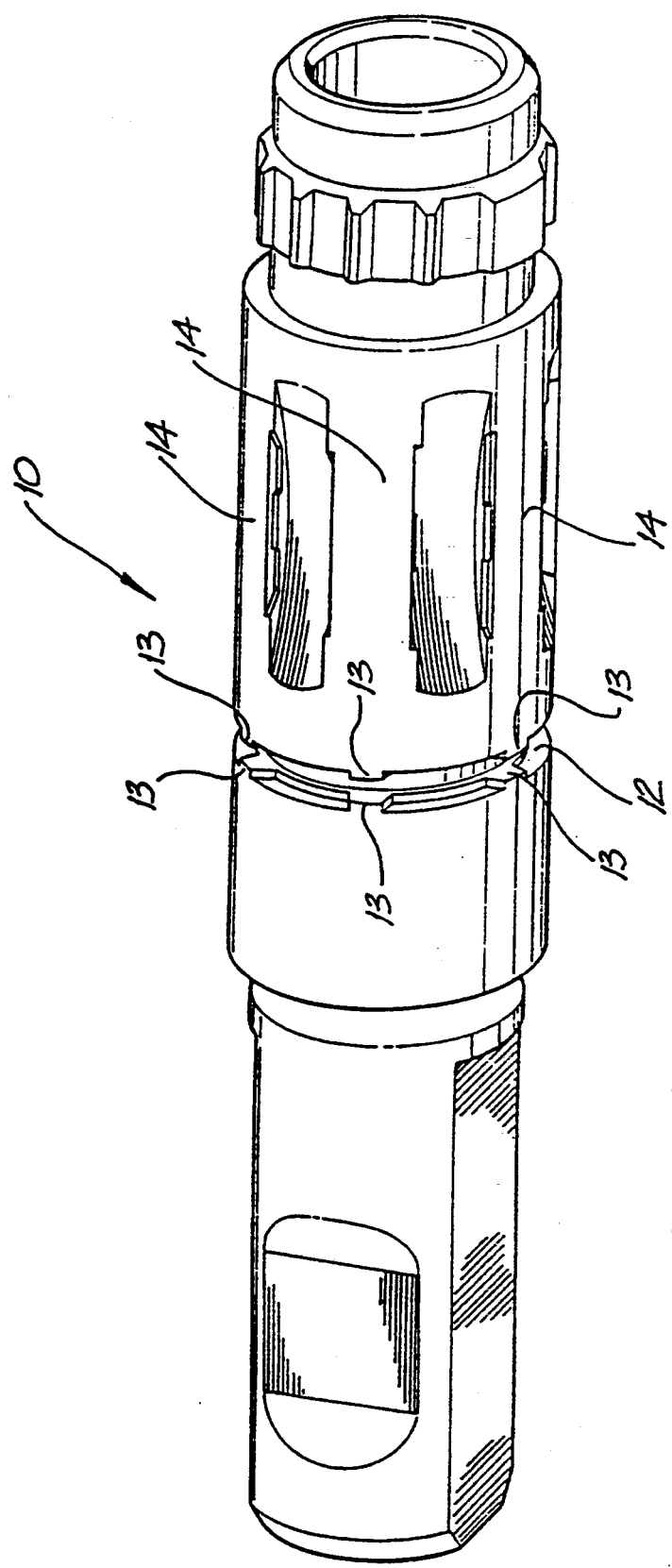
FIG. 1 is a perspective view of an input shaft according to the invention.
Figure 2:
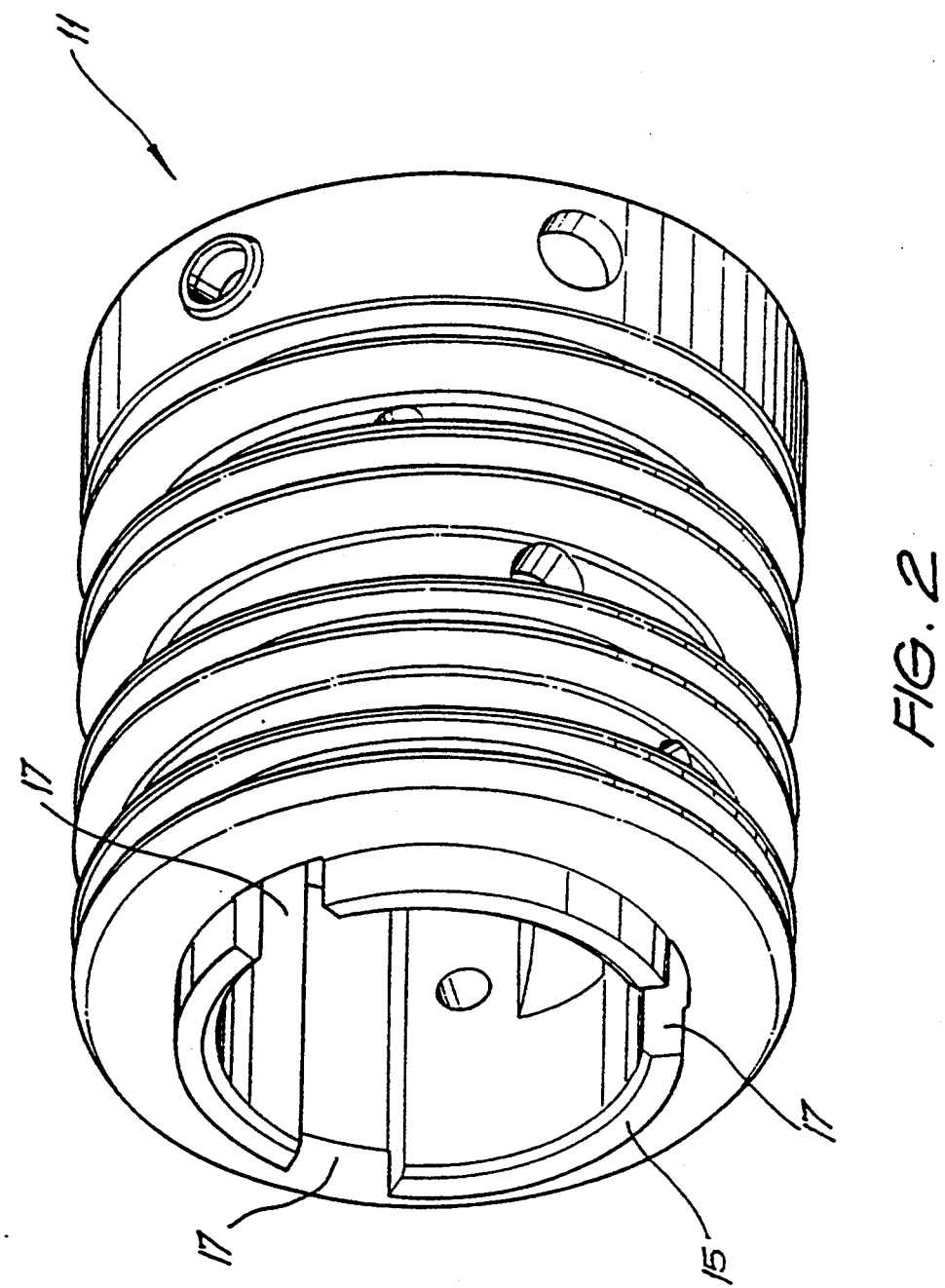
FIG. 2 is a perspective view of a sleeve according to the invention.

The input shaft 10 (FIG. 1) and the sleeve (FIG. 2) are of generally conventional construction and only those parts concerned with the present invention will be described.

Figure 4:
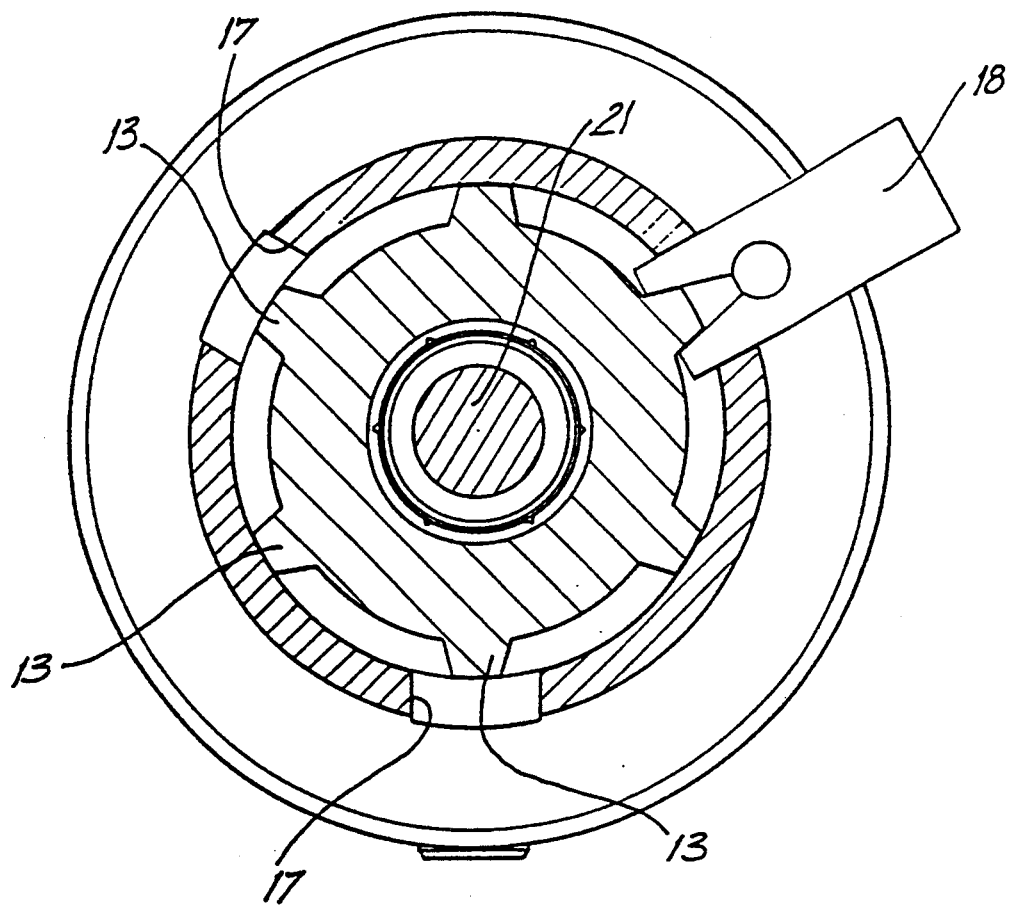
FIG. 4 is a cross sectional view showing an input shaft being centralised relative to a sleeve.

There is formed in the input shaft 10 a circumferential groove 12 that has in its sides a plurality of projections 13 of truncated triangular shape each of which is accurately aligned with one of the lands 14 of the input shaft. The shape of the projections 13 is best seen in FIG. 4.

The sleeve 11 has projecting from it an annular projection 15 through which each alternate slot in the sleeve 11 exits to form apertures 17 the sides of which are necessarily precisely aligned with the sides of the slots. The construction of the slots so that they exit from the end of the sleeve is a well known method of allowing return oil to leave the sleeve. The present invention, however, provides the additional feature of the annular projection 15 and the apertures 17 and it is for this reason that the construction of alternate slots in the manner illustrated is to be preferred although for the purposes of alignment a single aperture and a single projection would suffice.

Figure 3:
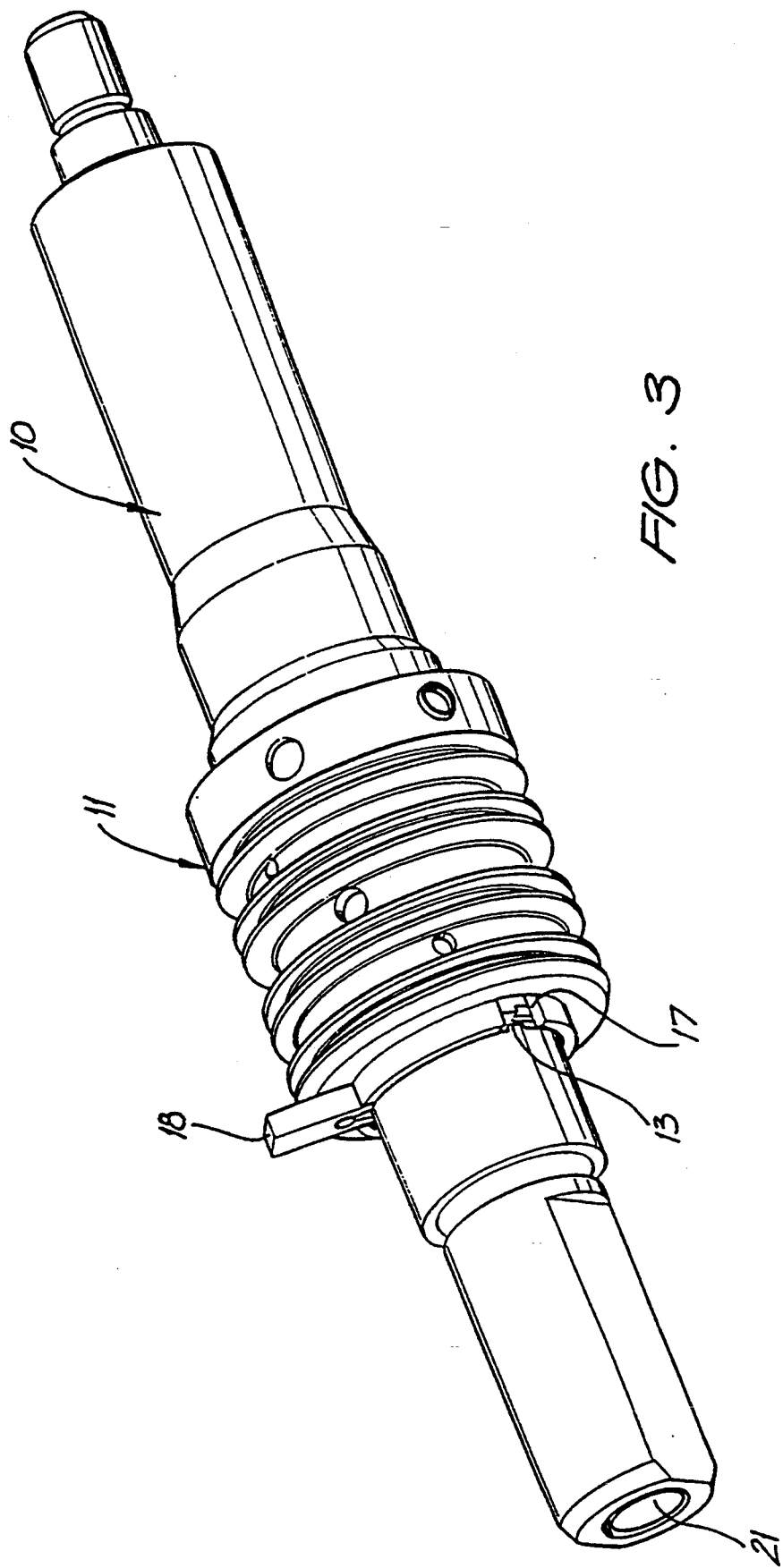
FIG. 3 is a perspective view of the sleeve and input shaft assembled.
Figure 5:
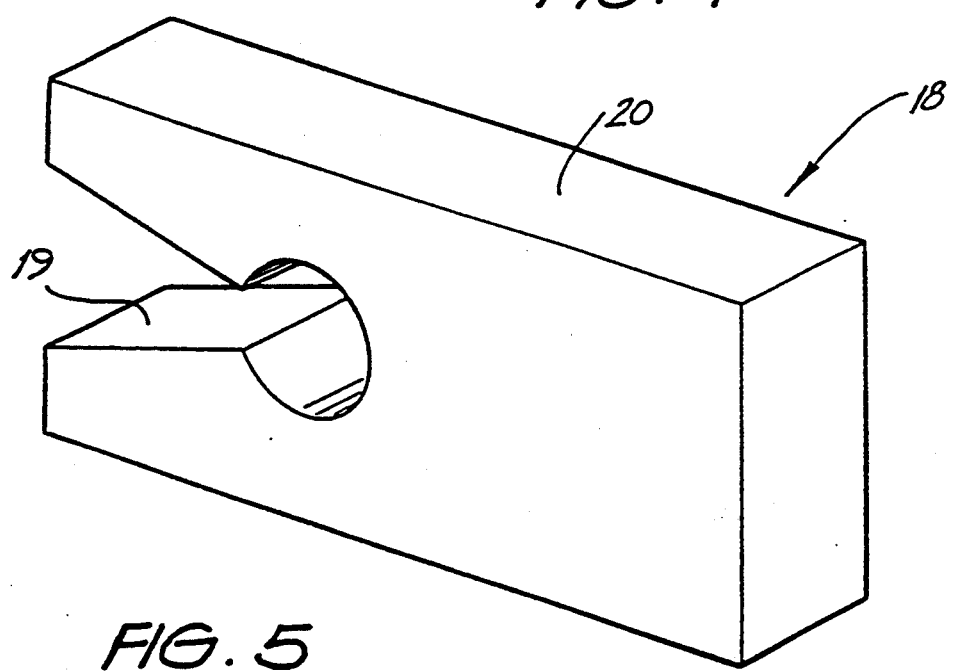
FIG. 5 is a perspective view of a centralising fork for use in a centralising procedure.

It will be seen from FIG. 3 that when the input shaft 10 is assembled in the sleeve 11 the annular groove 12 is accessible through the apertures 17 for purposes of axial alignment of the input shaft 10 and the sleeve 11. A special tool in the form of the centralising fork 18 shown in FIG. 5, is used. This is bifurcated at one end and has inner faces 19 that are arranged at precisely the same angle as the sides of the projections 13 and outer faces 20 that fit exactly within the aperture 17. The alignment is effected by the insertion of the centralising fork 18 in an aperture 17 as illustrated in FIG. 4. The faces 19 of the centralising fork 18 locate on the projections 13 which act to spread the bifurcated ends of the centralising fork so that clearance free fit is obtained in the aperture 17. Once the input shaft has been accurately centralised the torsion bar 21 can be brazed to the input shaft by induction heating or secured by means of an adhesive known as "LOC-TITE" which possibility exists by the fact that there is no oil on the parts as would be the case in conventional centralising procedures. These methods of affixing the torsion bar to the input shaft have the advantage of eliminating the usual trim pin and torsion bar seal.

The preferred form of the invention described above is given by way of example only of a variety of possible applications of the invention as defined broadly above.

I claim:

1. A rotary valve for hydraulic power steering of vehicles comprising an input shaft incorporating a torsion bar, the input shaft having in its outer periphery a plurality of blind ended, longitudinally extending slots separated by lands, a sleeve fitting closely about the input shaft and rotatable and movable axially in relation thereto, the sleeve having in its bore a similar array of longitudinally extending slots matching those of the input shaft but in underlap relationship thereto, the slots of the one being wider than the lands of the other so defining a set of longitudinally extending orifices which open and close when relative rotation occurs between the input shaft and the sleeve characterised in that one or more of the slots in the sleeve is constructed to exit from the end of the sleeve to form in an annular extension of the sleeve a radially extending aperture, the sides of which are in alignment with the sides of the slot in the sleeve, the input shaft having formed in its surface at a point externally of the sleeve one or more projections or other irregularities each of which is precisely aligned with one of the lands in the input shaft the arrangement being such that, by means of an appropriate tool each projection or irregularity on the input shaft can be brought into and held in accurate alignment with one of said apertures on the sleeve to permit permanent connection of the input shaft and torsion bar and ensure symmetry of operation of the valve.

2. A rotary valve as claimed in claim 1 wherein each alternate slot in the sleeve is constructed to exit from the end of the sleeve to form a radially extending aperture.

3. A rotary valve as claimed in claim 1 wherein the projections or other irregularities are projections of truncated triangular shape each accurately aligned with one of the lands of the input shaft formed on the sides of a circumferential groove formed in the input shaft.

4. A rotary valve as claimed in claim 2 wherein the projections or other irregularities are projections of truncated triangular shape each accurately aligned with one of the lands of the input shaft formed on the sides of a circumferential groove formed in the input shaft.

* * * * *